(12) United States Patent
Noe

(10) Patent No.: US 11,076,591 B2
(45) Date of Patent: Aug. 3, 2021

(54) ELECTRONIC CALL DECOY TECHNOLOGY

(71) Applicant: Tim Noe, Hudson, WI (US)

(72) Inventor: Tim Noe, Hudson, WI (US)

(73) Assignee: Expedite International, Inc.

( * ) Notice: Subject to any disclaimer, the term of this patent is extended or adjusted under 35 U.S.C. 154(b) by 52 days.

(21) Appl. No.: 15/980,369

(22) Filed: May 15, 2018

(65) Prior Publication Data

US 2018/0325099 A1  Nov. 15, 2018

Related U.S. Application Data

(60) Provisional application No. 62/506,227, filed on May 15, 2017.

(51) Int. Cl.
| | | |
|---|---|---|
| *A01M 31/00* | (2006.01) | |
| *H04N 5/232* | (2006.01) | |
| *H04R 1/34* | (2006.01) | |
| *H04R 1/30* | (2006.01) | |
| *A01M 31/06* | (2006.01) | |
| *H02K 7/14* | (2006.01) | |

(52) U.S. Cl.
CPC ........ *A01M 31/004* (2013.01); *A01M 31/002* (2013.01); *A01M 31/06* (2013.01); *H04N 5/23299* (2018.08); *H04R 1/345* (2013.01); *H02K 7/14* (2013.01); *H04R 1/30* (2013.01); *H04R 2201/025* (2013.01)

(58) Field of Classification Search
CPC .... A01M 31/04; A01M 31/002; A01M 31/00; A01M 31/06; A01M 29/00; A01M 29/16; A01M 99/00

USPC ..................... 43/1, 2, 3; 116/22 A
See application file for complete search history.

(56) References Cited

U.S. PATENT DOCUMENTS

| | | | | |
|---|---|---|---|---|
| 5,802,197 A * | 9/1998 | Fulcher | ................. | H04R 1/021 381/386 |
| 6,983,103 B1 * | 1/2006 | Parcher | ............... | A01M 31/004 222/146.5 |
| 7,029,362 B1 * | 4/2006 | Halstead | ............. | A01M 31/004 446/397 |
| 7,082,710 B1 * | 8/2006 | Jorgenson | ............. | A01M 31/06 43/2 |
| 8,860,577 B1 * | 10/2014 | Chumas | ............. | A01M 31/004 248/127 |
| 2002/0064094 A1 * | 5/2002 | Gaspari | ............... | A01M 31/004 367/139 |

(Continued)

*Primary Examiner* — Darren W Ark
*Assistant Examiner* — William L Gmoser
(74) *Attorney, Agent, or Firm* — Skinner and Associates; Joel D. Skinner, Jr.

(57) ABSTRACT

An electronic caller decoy that is used in hunting animals. The caller is particularly useful for attracting predator species such as coyotes, wolves, and the like. The decoy encourages predators to come towards the decoy within the range of a concealed hunter or hunters. The decoy simulates the sound and movement of wounded prey species such as rabbits, deer, and the like, to bring the predator within range. The decoy has a base including three or more legs, a body which is preferably rotatable on the base via a motor, an electronic sound generator and speaker, a microphone, a camera and a tail element. The motorized rotatable base is preferably remote controllable to orient sound broadcast in a specific direction, or plural directions.

1 Claim, 9 Drawing Sheets

(56) References Cited

U.S. PATENT DOCUMENTS

| | | | |
|---|---|---|---|
| 2002/0071050 A1* | 6/2002 | Holmberg | A01M 31/00 348/373 |
| 2005/0075045 A1* | 4/2005 | Williamson | A01M 1/00 446/484 |
| 2006/0119482 A1* | 6/2006 | Hanscom | A01M 31/002 340/573.1 |
| 2006/0174533 A1* | 8/2006 | Rusciano | A01M 31/002 43/1 |
| 2008/0057823 A1* | 3/2008 | Simone | F41C 27/00 446/213 |
| 2008/0060249 A1* | 3/2008 | Stillwell | A01M 31/06 43/2 |
| 2008/0170741 A1* | 7/2008 | Sceery | A01M 31/004 381/387 |
| 2010/0096409 A1* | 4/2010 | Wainwright | A01M 1/2038 222/181.2 |
| 2010/0139146 A1* | 6/2010 | Elpi | A01M 31/06 43/3 |
| 2010/0151769 A1* | 6/2010 | Coffield | A01M 31/004 446/418 |
| 2011/0113672 A1* | 5/2011 | Holmberg | A01M 31/06 43/2 |
| 2011/0146132 A1* | 6/2011 | Young | A01M 31/06 43/3 |
| 2012/0008464 A1* | 1/2012 | Barley | A01M 31/004 367/197 |
| 2013/0305586 A1* | 11/2013 | Forrester | A01M 31/06 43/2 |
| 2014/0240890 A1* | 8/2014 | Bradshaw | A01K 15/029 361/232 |
| 2014/0263687 A1* | 9/2014 | Rich | A01M 29/30 239/1 |
| 2015/0096500 A1* | 4/2015 | McCain | A01M 31/004 119/719 |
| 2015/0208640 A1* | 7/2015 | Marsh | A01M 31/06 43/3 |
| 2016/0324140 A1* | 11/2016 | Gregorich | A01M 31/004 |
| 2017/0164603 A1* | 6/2017 | Kovarik | A01M 29/10 |

\* cited by examiner

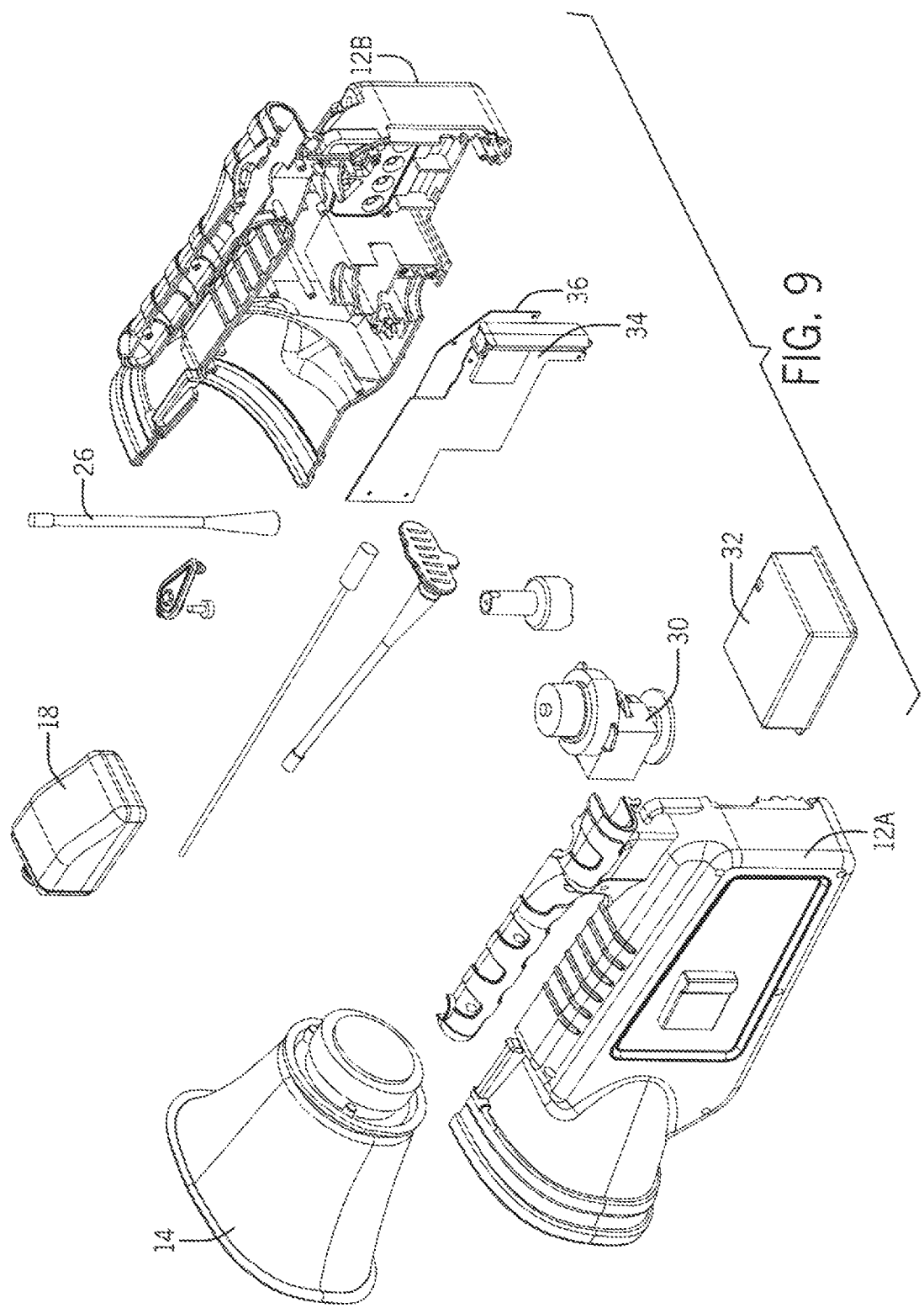

ELECTRONIC CALL DECOY TECHNOLOGY

CROSS-REFERENCE TO RELATED APPLICATIONS, IF ANY

This application claims the benefit under 35 U.S.C. § 119(e) of U.S. Provisional Patent Application Ser. No. 62/506,227, filed May 15, 2017, which is/are hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to decoy systems, apparatus and methods. Particularly, the invention relates to a decoy used in hunting, animal control, ranching or the like. Most particularly, the invention relates to a remote controllable electronic call type decoy for predators.

2. Background Information

Existing technology in this field is believed to have significant limitations and shortcomings. For this and other reasons, a need exists for the present invention.

All US patents and patent applications, and all other published documents mentioned anywhere in this application are incorporated by reference in their entirely.

BRIEF SUMMARY OF THE INVENTION

The invention provides a decoy apparatus, method of manufacture, and method of use which are practical, reliable, safe and efficient, and which are believed to fulfill the need and to constitute an improvement over the background technology.

In one aspect, the invention provides a predator decoy or caller that is used in hunting animals, particularly predator species such as coyotes, wolves, and the like. The decoy encourages predators to come towards the decoy within the range of a concealed hunter or hunters. The decoy simulates the sound and movement of wounded prey species such as rabbits, deer, and the like, to bring the predator within range. The decoy has a base including three or more legs, a body which is preferably rotatable on the base via a motor, an electric sound generator and speaker, a microphone, a camera and a tail element.

In another aspect, the invention provides an electronic caller decoy, comprising: a body including a housing, an electronic controller disposed within the housing, a power supply disposed within the housing and connected to the control circuit, and a motor disposed within the housing and connected to the power supply and to the electronic controller; a speaker connected to the body and to the electronic controller; and a base connected to the housing and to the motor; the base being for placement on an environmental surface for supporting the housing; the electronic controller generating sounds and sending them to the speaker for broadcast; and the electronic controller also instructing the motor to activate and turn the housing and speaker to broadcast the generated sounds in plural directions.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 9 is an exploded view of an embodiment of the decoy of the invention.

DETAILED DESCRIPTION

Figure 1:
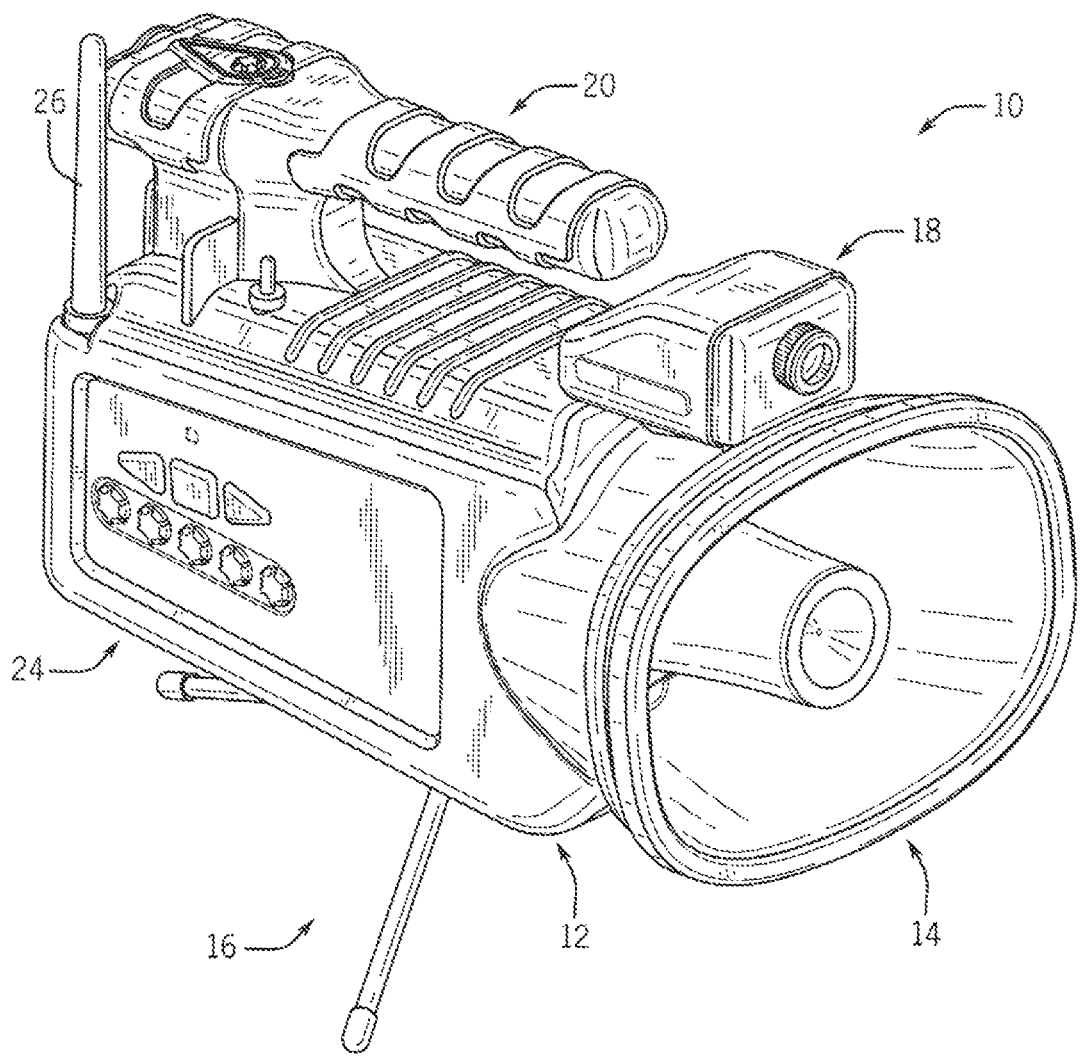
FIG. 1 is a perspective view of an embodiment of a predator decoy or electronic caller of the invention.
Figure 2:
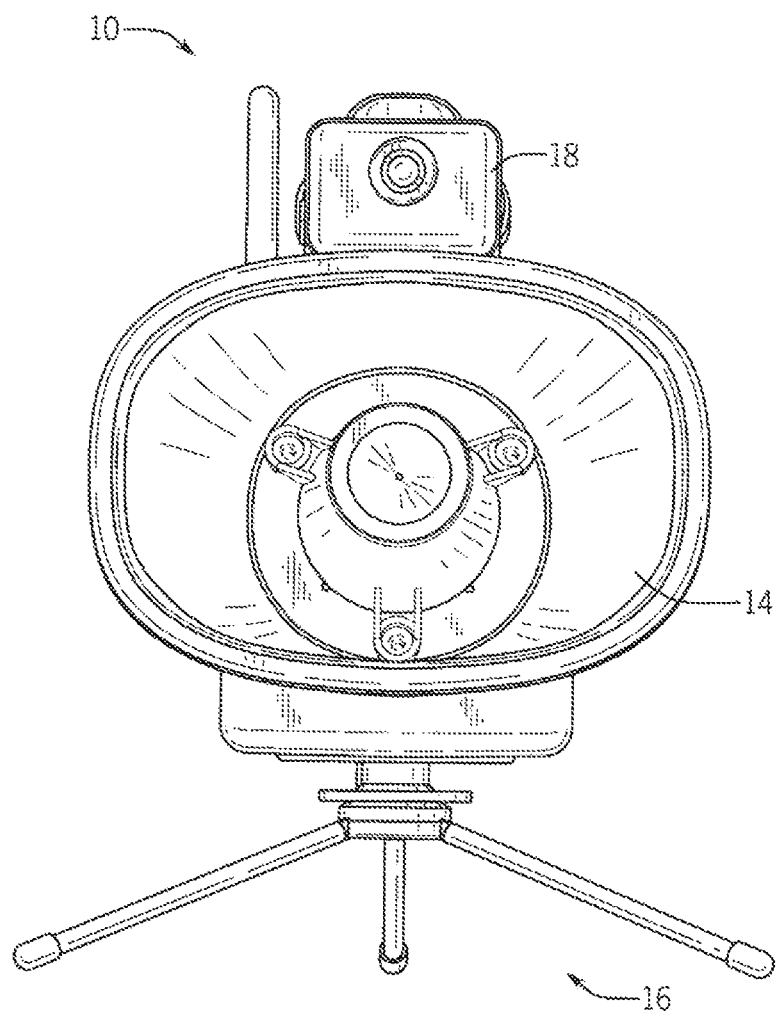
FIG. 2 is a front view thereof.
Figure 3:
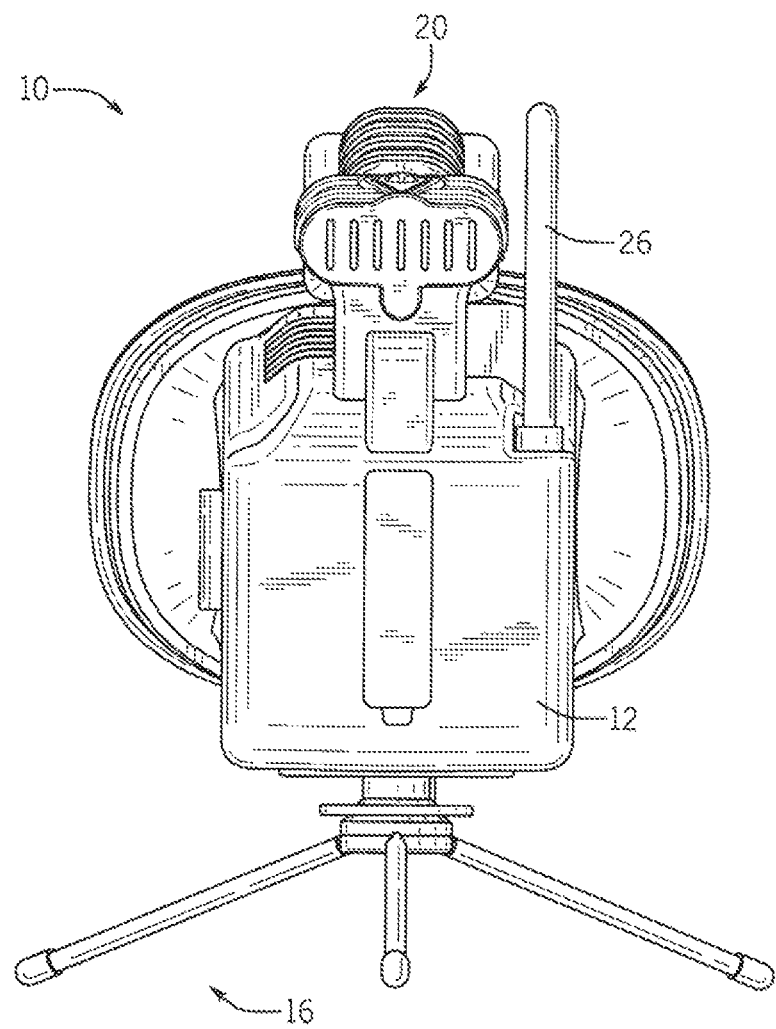
FIG. 3 is a back view thereof.
Figure 4:
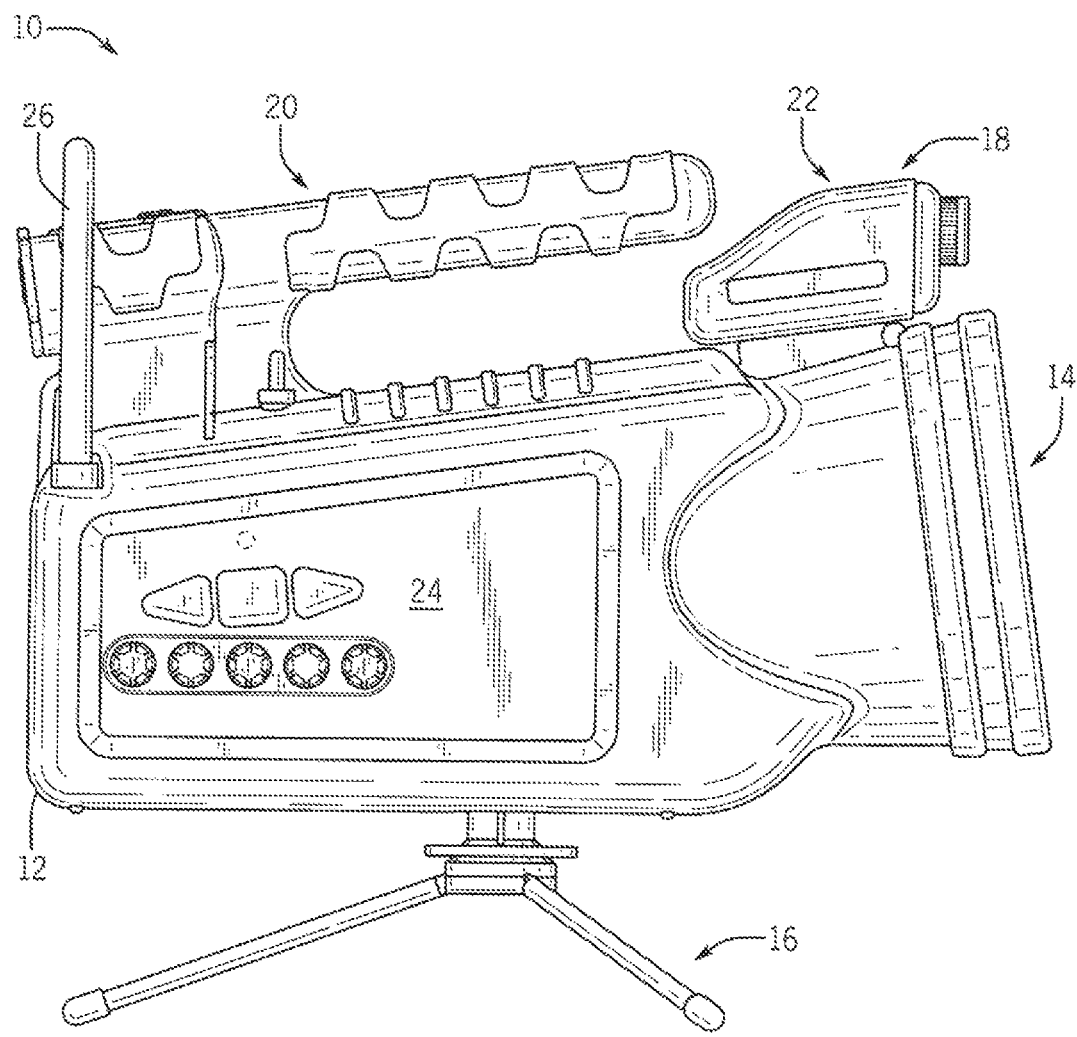
FIG. 4 is a side view thereof.
Figure 5:
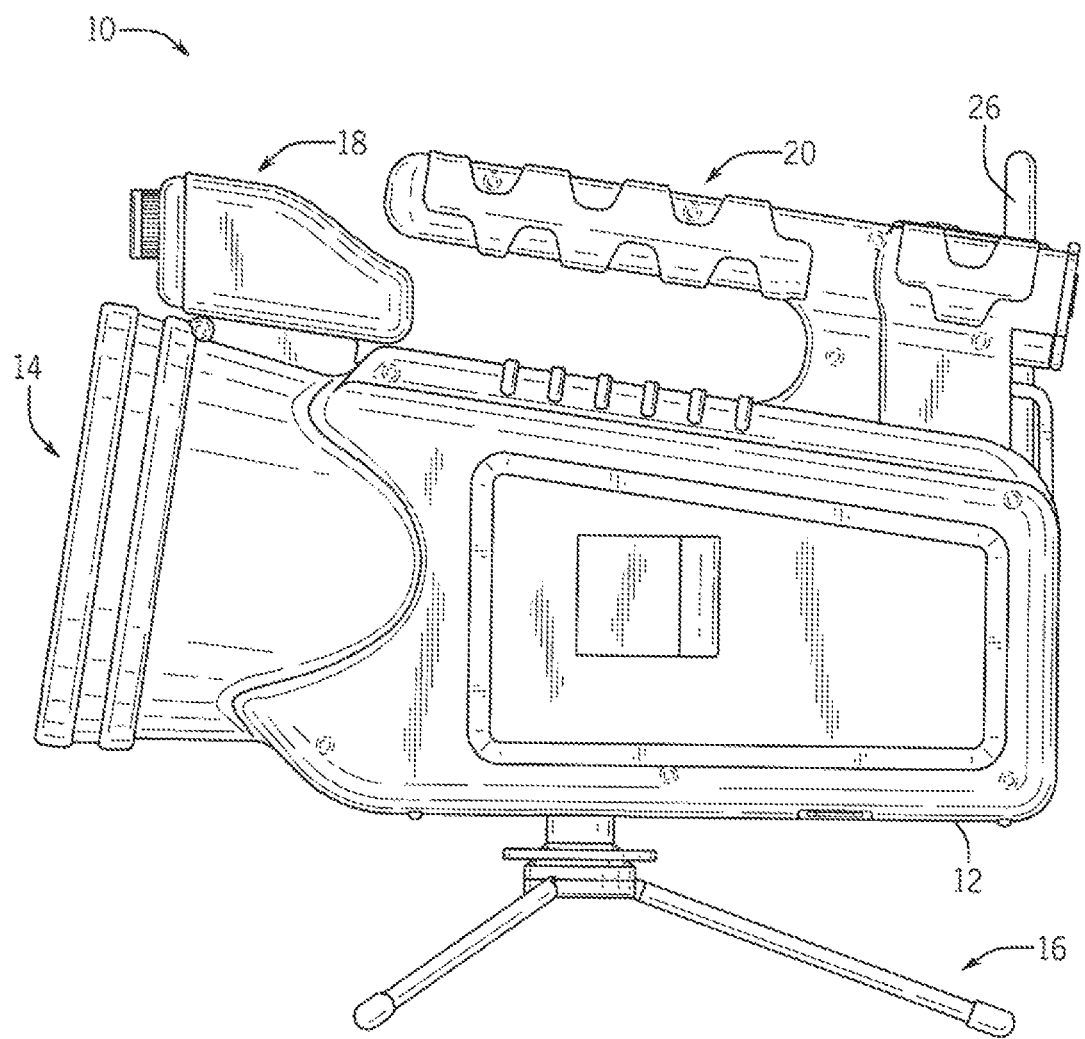
FIG. 5 is an opposite side view thereof.
Figure 6:
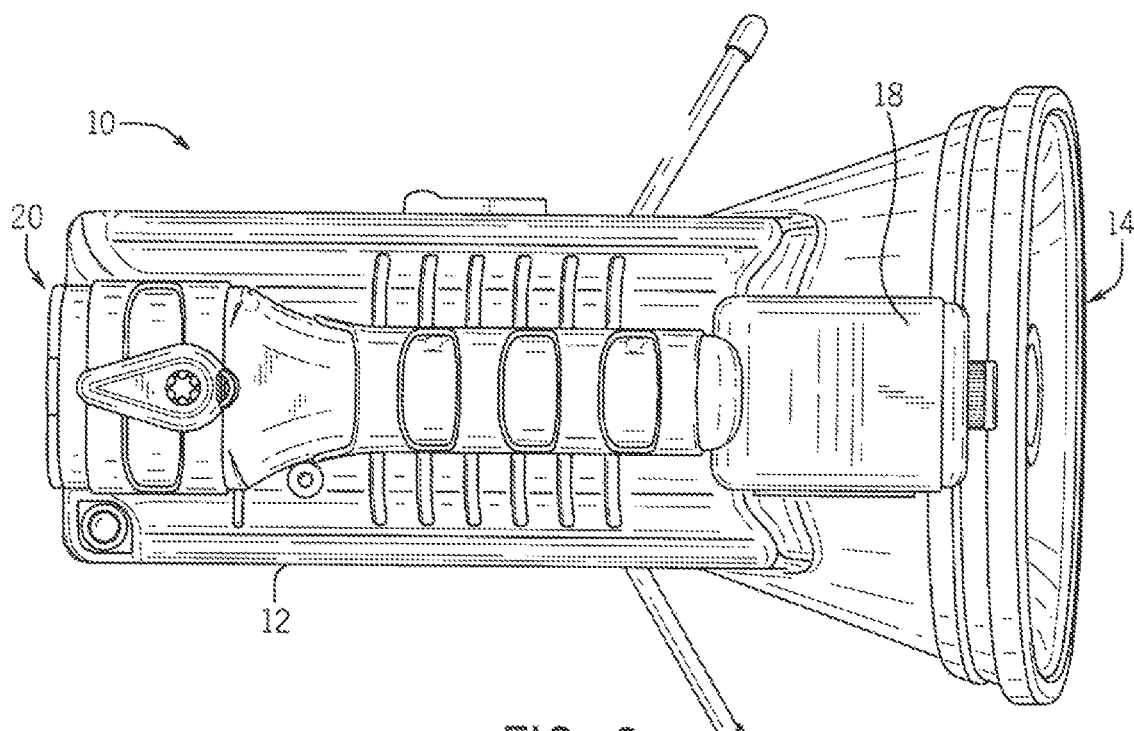
FIG. 6 is a top view thereof.
Figure 7:
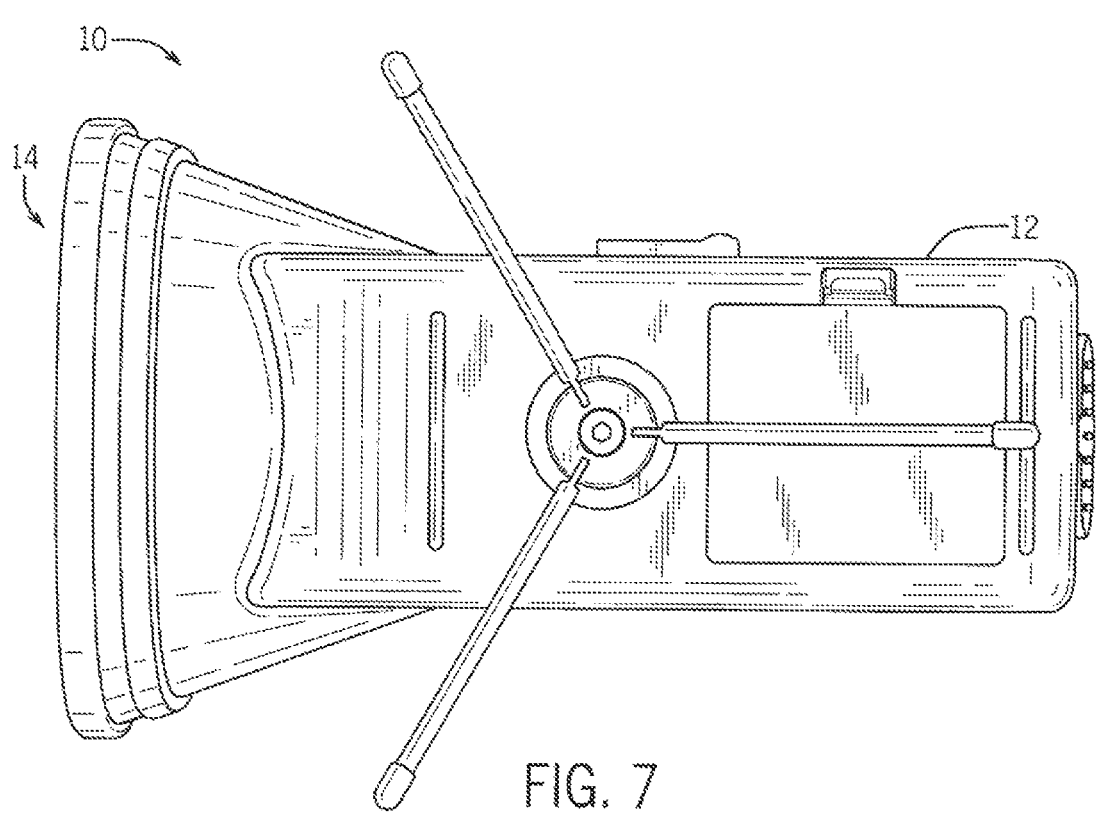
FIG. 7 is a bottom view thereof.

FIGS. 1-7 and 9, show an embodiment of the electronic caller or decoy 10 for predator of the present invention. The predator decoy 10 is useable in hunting animals, particularly predator species such as coyotes, wolves, and the like. The decoy 10 encourages predators to come towards the decoy within the range of a concealed hunter or hunters. The decoy 10 simulates the sound and movement of wounded prey species such as rabbits, deer, and the like, to bring the predator within range.

The decoy 10 includes a main body 12 with a speaker 14 disposed at one end. The body 12 is preferably generally rectangular, with radiused edges. The body 12 may comprise two (2) halves 12A and 12B. The main body 12 is supported by a base 16 on its bottom. The base 16 is preferably a tripod type arrangement. A camera 18 is preferably disposed on the top of the body 12, towards the speaker 14 end. The speaker 14 is preferably a horn-type speaker. It may also include a separate tweeter type speaker. The camera 18 preferably has still and video capability. A handle 20 is also disposed on the top of the body 12. A microphone 22 may be integrated with the camera 18. An electronic control panel 24 is disposed on one side of the body 12. An antenna 26, disposed on the top of the body 12 at a corner where the side featuring the control panel meets the back of the body 12. The antenna 26 is communicatively connected to electronic control circuitry contained in the housing 12 for remote control purposes. The control circuitry is also connected to the control panel 24.

FIG. 9 is an exploded view of the decoy 10. The body 12 preferably is constructed of two halves 12A and 12B. Motor 30 is connected to the body 12 and the base 16. The motor is powered by a power source 32, preferably a battery. The electronic circuitry is shown to include a pair of PCB cards 34 and 36. The circuit 34/36 has sound control. motor control, camera/video control, and remote control transmission capabilities. A preferred remote control transmission is via RF.

In use, the motor connected to the body 12 which rotates the body 12 on the base 16. The motorized base system is preferably remote controlled. This system allows the hunter to rotate the unit left or right to broadcast the sound up to 360 degrees. Sound is directional so the direction the speaker is pointed is the direction the sound will travel—being able to rotate the speaker remotely allows the decoy 10 to have a greater efficacy because the decoy will be able to project the sound in all horizontal directions, potentially luring more game. The other benefit of rotating the unit is the sound is moving which will seem more natural to animals. Many times animals are making noise while traveling so moving the sound will sound like an animal moving around. The call permits the use of one speaker to broadcast sound 360 degrees, obviating the need tor plural speakers.

Although the decoy 10 is described above as having a single speaker, it is within the purview of the invention that it can have one or more additional speakers.

Although the decoy 10 is described above as having a camera, it is within the purview of the invention that it may not have a camera.

The decoy or electronic hunting call is particularly useful for predator hunting. However, it can also be used tor snow geese hunting. Snow geese are the only waterfowl with which electronic calls can be used presently. The call encourages animals to come towards the sound of the call.

Figure 8:
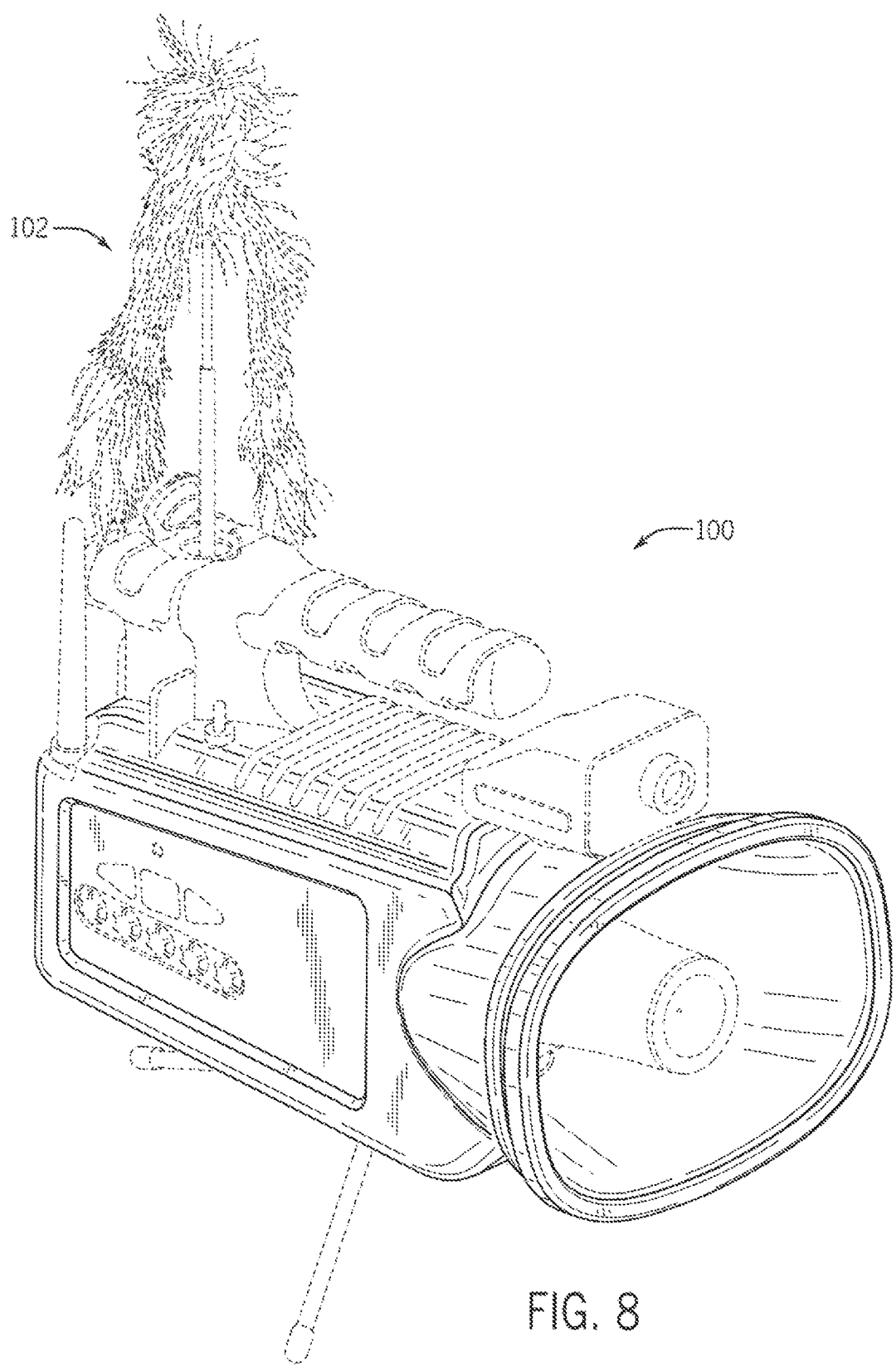
FIG. 8 is a perspective view of an alternative embodiment of the predator decoy of the invention.

FIG. 8 shows an alternative embodiment of the decoy 100 including a moving animal part element 102. Decoy 100 is constructed substantially similar to decoy 10 in FIGS. 1-7 and 9.

Figure 11:
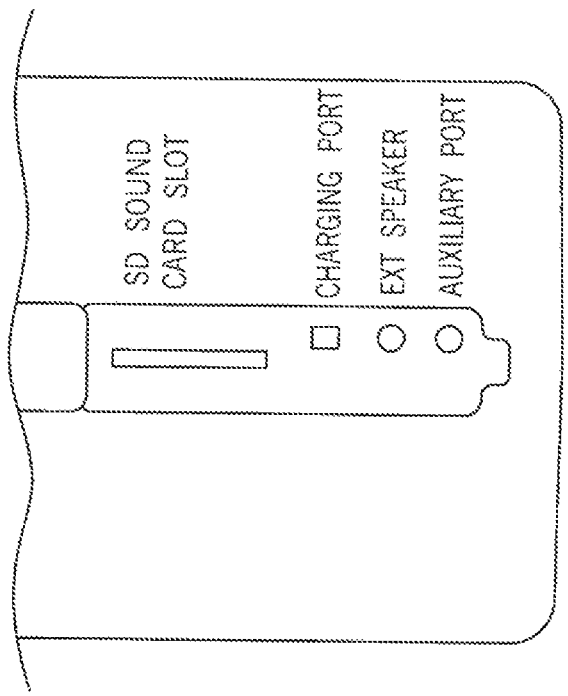
FIG. 11 shows a detailed view of the SD card slot and ports of the caller.
Figure 10:
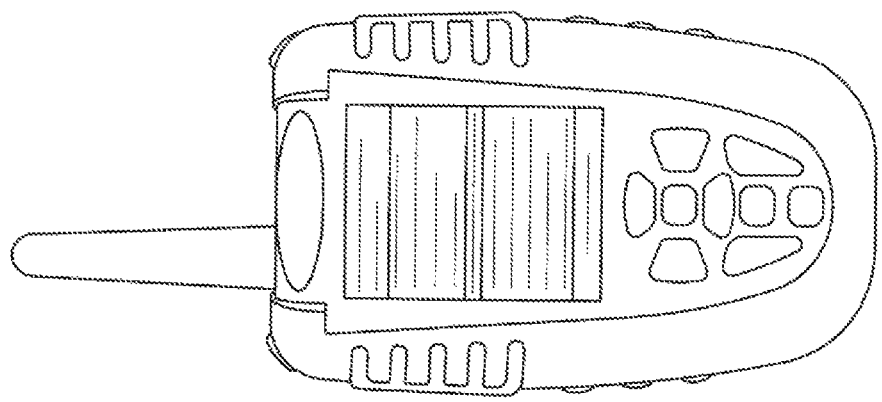
FIG. 10 shows an embodiment of the remote controller.

FIGS. 10 and 11 show an embodiment of the remote controller and the SD cad slot and ports of the caller, respectively.

Referring to all of the decoy embodiments 10, 100, 200 and 300. The function of the system is described below.

Battery Installation: The decoy 10 uses ten AA batteries (not included). A battery holder is located on the bottom of the body 12. Remove the battery cover, disconnect the battery holder if necessary, and install the batteries. The remote control uses three AA batteries. Remove the battery cover on the back of the remote control 220 and install the batteries.

Antenna: The antenna 26 will either be in the box or stored in the handle of the call. Locate the antenna port on the back right corner of the body 12 and screw the antenna onto the caller.

Decoy: The moving animal part decoy 102 will either be in the box or stored in the handle of the call. Insert the decoy into the hole on the top of the handle. Make sure to align the groove on the decoy with the slot on the decoy joint located in the handle. A strong magnet holds the decoy in place.

Tripod Base: The tripod base 16 is installed on the bottom of the body 12. The tripod base allows the decoy 10 to rotate to broadcast sound and position the video camera 18. Make sure to align the groove on the bottom of the body 12 with the slot on the tripod stand 16. A strong magnet holds the tripod 16 to the body 12. The tripod base 16 can be disassembled to adapt to most standard camera tripods or any other base system that utilizes a ¼ 20 thread. This may be helpful if the user wishes to elevate the call depending an the hunting terrain.

Electronic Call Operation: Flip the power switch on the electronic call forward to the "on" position. A red LED light on the side of the call will illuminate when the power is on. Hold down the power button on the remote control. The remote will turn on. The remote screen will display "Finding Caller" "Waiting" while it searches for the caller. Once connected the main home screen for the caller screen will be displayed. On the bottom of the home screen it should say SD Link OK confirming the remote and caller are connected and in sync.

Remote Control Operation:

Sound Selection—Use the up/down arrows to highlight the folder you want to select. Press the play/pause button to select the folder. Use the up/down arrows to highlight the sound you want to play. Press the play/pause button to play the sound. Holding the up/down arrows down for 1 second will cycle through the folders/sounds faster.

Volume Selection—Use the vol− and vol+ buttons to lower or increase the volume level. The volume level ranges from 1 to 32. Holding the vol− or vol+ buttons for 1 second will raise or lower the volume level quickly.

Back Button—The back button is used to go from the sound list back to the folder list.

Recall Button—The recall button will play the previous sound.

Display Screen—The remote display screen includes information on the top 2 lines as well as the bottom line.

Top Line (Left to Right):
  Stand timer which starts from zero when the remote is turned on
  Volume level from 1-32
  Remote control battery level indicator Second Line (Left to Right): Each icon will be highlighted when in use:
  AUX indicates if the auxiliary function is turned on
  REC indicates if the Video Camera is recording
  Camera indicates if a picture is being taken
  SD indicates if the SD card is installed and synced to the remote
  Signal indicates the strength of the signal between the remote and caller
  Speaker indicates if a sound is being played Bottom Line: States the previous function (i.e. video recording, photo, play/pause, etc.)

Remote Control Distance: The decoy 10 utilizes industry leading remote technology which does not require a line of site between the remote and the caller up to at least 100 yards. Depending on conditions, remote distance may be significantly greater than 100 yards.

Decoy Operation:

"D" Button—Press the "D" button to turn the decoy on. The decoy will spin back and forth.

"S" Button—Press the button to control the speed of the decoy. There are 3 speed settings.

Scan Operation:

Top/Bottom Scan Buttons—Press either button to rotate the call left or right. Press the button again to stop the call.

Middle Scan Button—Press this button to cover 180 degrees. The call will rotate 90 degrees to the left, 180 degrees to the right, and back 90 degrees to the left, which will be the approximate starting position. If the user needs to stop the call while rotating, simply press the scan button again.

The scan buttons are preferably used to broadcast sound to a large area. The powerful 30 watt/30 amp speaker system is designed to extend sound long distances in one direction. Using the scan function will broadcast sound to a large area calling in predators from a greater distance than most calls.

Favorite Buttons: F1-F4 are designed to store four favorite sounds for quick access when hunting. Press the F1 through F4 button once to play the programmed sound at the predefined volume level.

Program F1 through F4—Simply highlight the sound the user wants to program as a favorite and adjust the volume to your preferred level. Hold down the corresponding F1 through F4 button. The highlighted sound will flash on the display screen confirming the programming is complete.

Gain Control: Unique to the device is a three stage gain control function. The gain on this caller has 3 settings (1-3). One being the lowest and 3 being the highest (loudest). Whenever the caller is turned on it is set to gain level of "2". By adjusting the gain, the user is able to control the power running through the amp. One will notice a difference in the volume of the call between level 1 and level 3. Certain sound frequencies sound much better at a high gain where others sound better at a low gain. The user may add their own sounds to this caller, adjusting the gain may be useful depending on the sound being played since each sound recording is different. Adjusting the gain may also be useful depending on the hunting situation. For example, turning the gain to level 3 in strong wind conditions may be beneficial even if the sound quality is reduced (i.e. distortion).

Adjust Gain—Press the F5 key to cycle through the gain levels. The gain level will display on the display screen.

Auxiliary Function: The decoy 10 is designed with an auxiliary function which allows a separate decoy to be controlled remotely by connecting a compatible decoy (not included) to the back of the caller using a 3.5 mm cord (not included). Simply plug one end of the 3.5 mm cord into a compatible decoy and the other end into the auxiliary port on the back of the caller. Turn on the compatible decoy and the caller/remote. The auxiliary button "AUX" on the remote will now turn the compatible decoy on and off. The AUX icon on the top of the display screen will be highlighted when the auxiliary function is used.

HD Camera Operation: The decoy 10 is equipped with a wide angle high resolution video camera. The video camera also can take pictures. This video camera is a great feature allowing the user to capture video of his or her hunt. One can also use video or photos to remind the user of each stand, location, conditions, etc. where they were hunting. Before hunting, the user should ensure the SD card is installed in the camera slot.

Camera Button—Press the camera button to take a picture. The camera icon on the top of the display screen, will highlight and "Photo" will be stated on the bottom of the display screen.

Video Button—Press the RBC button to start video recording. Press the REC button again to stop recording. The REC icon on the top of the display screen will highlight and "Record Video On" will be stated on the bottom of the display screen. Press the REC button again to stop recording. The highlighting on the REC icon will disappear and "Record Video Off" will be stated on the bottom of the display screen. Sound is always recorded with the video. Use the scan buttons to rotate the caller and point the camera in the direction you want to capture.

To view photo and video on your computer, simply eject the SD card from the camera slot and insert into your computers SD card slot. Each individual video and image will be a separate file. Ensure your computer is utilizing windows media player to play the video.

Sound Management: The decoy 10 comes preloaded with 100 live animal sounds organized in 17 folders for quick access. The sounds are preferably professionally recorded. The 100 preloaded sounds have the extension .LD.

Add/Remove Sounds: The decoy 10 features an industry leading wireless 2 way communication system between the remote and caller. This makes syncing the caller to the remote extremely easy and quick.

1. Press the SD sound card in to eject the sound card and remove the SD sound card from the back of the caller
2. Add or remove the folders and sounds on the SD sound card using your computer. View the files just like you would view files on a standard camera SD card.
3. Reinstall the SD sound card into the caller (top side or label side of the SD card should face the left side of the caller when reinstalling)
4. Turn on the caller and remote and let them sync with each. Most syncs will lake 5-30 seconds. As stated in the "Electronic Call Operation" section, the remote screen, will display "Finding Caller" "Waiting" while it searches for the caller. Once connected the remove screen will display "Updating" and "Communication OK". The main home screen for the caller screen will then display.

The maximum number of sounds are 2,000 and the maximum number of folders are 32. There can only be one level of folders. You cannot create a folder within a folder. The file names can be as long as you would like but the display screen will only show the first 20 characters.

The caller will play .LD, .mp3, .wav and .wma files. Errors between the remote and caller may occur when using .wav and .wma files due to their potential file size. Use of .LD and .mp3 files is recommend. If you do use .wav and/or .wma files and experience issues, simply remove the files from the SD card and resync the remote and caller.

Charging Port: The decoy 10 is equipped with a charging port.

Caller Buttons on Main Unit: The decoy 10 includes play/pause, volume and favorite buttons on the caller in case the remote is lost or the user wants to use the caller without the remote.

The embodiments above are chosen, described and illustrated so that persons skilled, in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified, function it is intended that such claim be construed to covet the corresponding structure, material, or acts described in the specification and equivalents thereof, including both structural equivalents and equivalent structures, material-based equivalents and equivalent materials, and act-based equivalents and equivalent acts.

What is claimed is:

1. A portable, stationary rotatable electronic sound caller predator decoy, comprising:
   a. a body including:
      i. a housing,
      ii. an electronic controller disposed within the housing,
      iii. a power supply disposed within the housing and communicatively connected to the electronic controller, and
      iv. a motor disposed within and connected to the housing, the motor having a lower portion extending downwardly and outwardly from the housing, and communicatively connected to the power supply and to the electronic controller;
   b. a single horn type speaker connected to the body and communicatively connected to the electronic controller for broadcasting sound in one direction;
   c. a tripod base connected to the lower portion of the motor, the tripod base having three legs, rigidly mounted, and extending radially outwardly and downwardly from a center axis of the base, the legs being adapted to be placed on an environmental surface;
   d. a remote controller adapted to transmit rotational motion and sound control signals to the electronic controller;
   e. a camera disposed on the housing oriented towards the speaker, and communicatively connected to the electronic controller, the camera adapted to record at least one picture of an animal species being attracted to and approaching the decoy;
   f. a motion decoy element disposed on the housing, the motion decoy element being communicatively connected to the motor, and wherein the electronic controller activates and terminates movement of the motion decoy element by the motor;
   g. the tripod base being for placement on the environmental surface for supporting the housing in a fixed, stationary position;
   h. whereby the electronic controller generates sounds and sends them to the single speaker for broadcast; and
   i. whereby the electronic controller also instructs the motor to activate and rotationally turn the housing and the single speaker about the tripod base, and to broadcast the generated sounds in a selection of plural directions or a specific direction, from a stationary position of the decoy to imitate a natural sound pattern of prey, the selection consisting of:
      rotating the housing and single speaker from a starting position over all or a portion of a 360 degree path selected by the user by manual control, and
      rotating, by automatic control, the housing and single speaker from a starting position 90 degrees in a first direction, 180 degrees in a second, opposite direction, and 90 degrees in the first direction to return to the starting position;
   whereby a user can manually move the direction of broadcast of sounds from the stationary position of the decoy, in particular directions via the manual control, or can automatically move the direction of broadcast of sounds in a preset middle scan pattern via the automatic control.

* * * * *